UNITED STATES PATENT OFFICE.

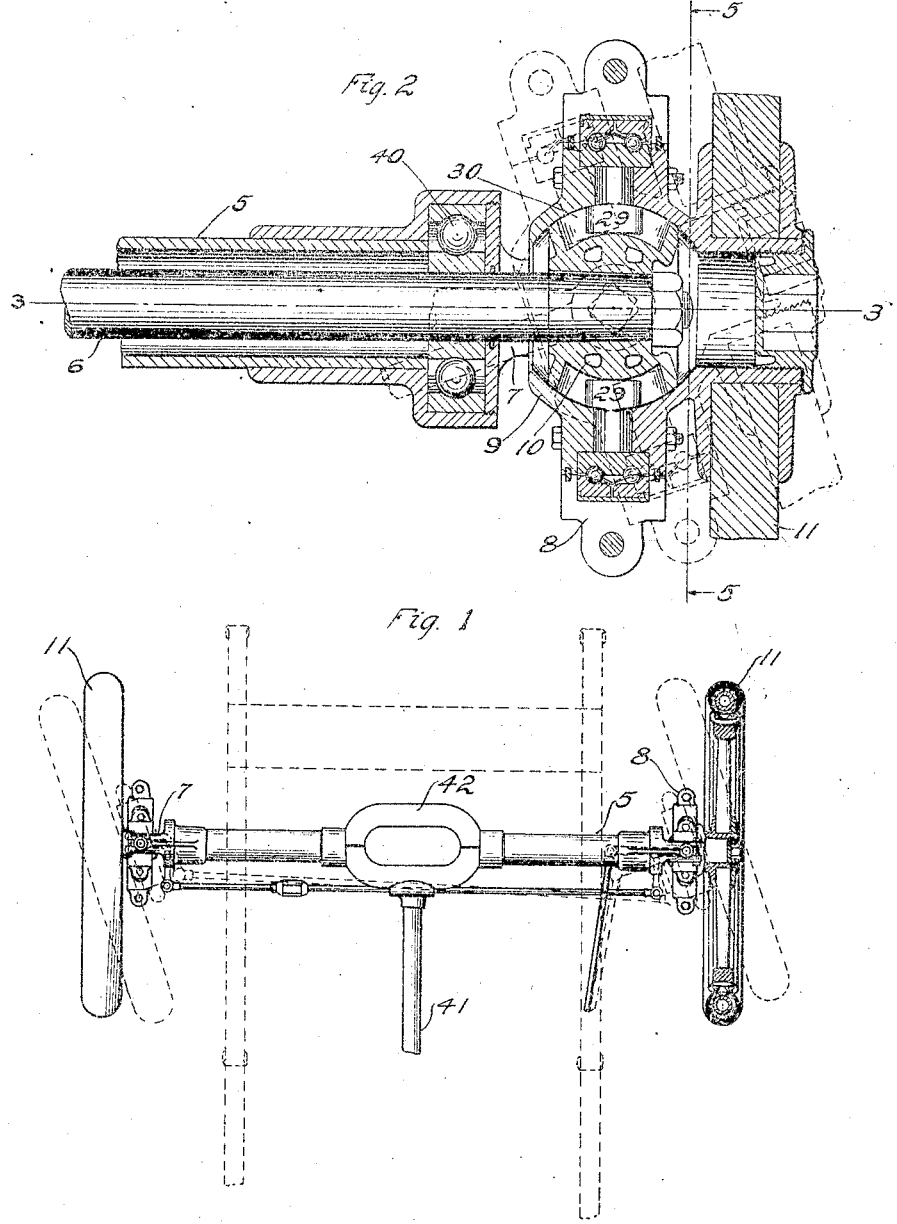

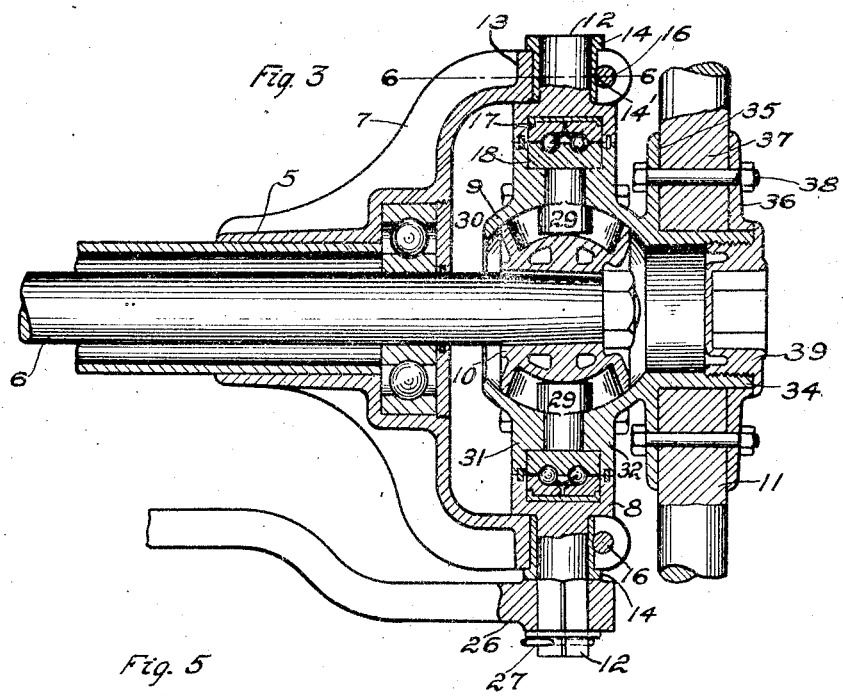
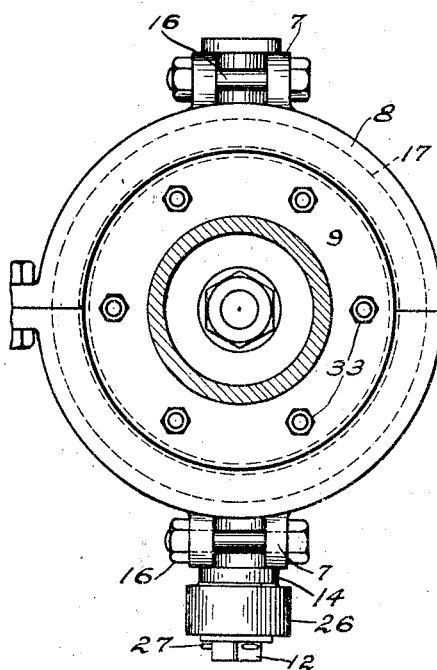
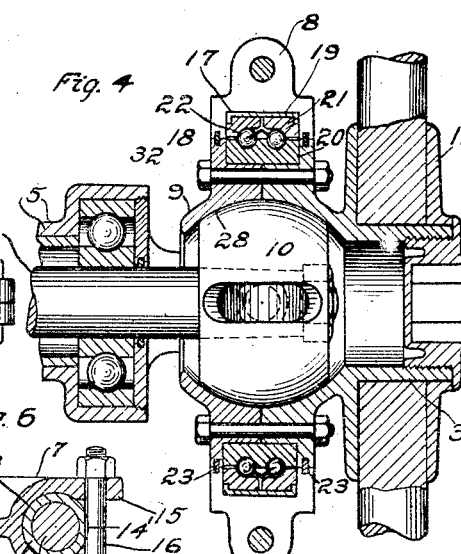

RALPH H. ROSENBERG, OF COLUMBUS, OHIO, ASSIGNOR TO THE KINNEAR MANUFACTURING COMPANY, OF COLUMBUS, OHIO, A CORPORATION OF WEST VIRGINIA.

STEERING AND DRIVING WHEEL FOR MOTOR-VEHICLES.

1,211,238.  Specification of Letters Patent.  Patented Jan. 2, 1917.

Application filed October 6, 1910. Serial No. 585,712.

*To all whom it may concern:*

Be it known that I, RALPH H. ROSENBERG, a citizen of the United States, and a resident of Columbus, county of Franklin, and State of Ohio, have invented certain new and useful Improvements in Steering and Driving Wheels for Motor-Vehicles, of which the following is a full, clear, and exact description, such as will enable others skilled in the art to make and use the same.

My invention relates to motor vehicles and has particular reference to improvements in so-called front drive vehicles, by which term it is meant that the driving power of the engine is exerted upon the front wheels of the vehicle.

The object of my invention is to provide an improved power transmission device for use as a front driving mechanism which will permit the driving wheels of the vehicle to be used also as steering wheels thereof.

My invention consists in various novel details of construction and in combination of parts, all as hereinafter described and particularly pointed out in the claims.

My invention will be more readily understood by reference to the accompanying drawings forming a part of this specification and in which:

Figure 1 is a plan view of a front axle of a motor driven vehicle or automobile, equipped with combination driving and steering wheel connections embodying my invention; Fig. 2 is a enlarged sectional view of one of the combination connections on the line 2—2 of Fig. 1; Fig. 3 is a sectional view on the line 3—3 of Fig. 2 but showing the same section of the rotating members, as shown in Fig. 2; Fig. 4 is a view similar to Fig. 3, but showing the rotating member turned to a position at 90° to that shown in Figs. 2 and 3; Fig. 5 is a transverse sectional view on the line 5—5 of Fig. 2; Fig. 6 is a fragmentary detail sectional view on the line 6—6 of Fig. 3.

Those who are skilled in the art will understand that my combination steering and driving wheel connections between axles and wheels may be employed upon both axles of the motor vehicle or on only one. In the latter case I always equip the front axle. I have not undertaken to illustrate a complete motor vehicle in the drawings, inasmuch as the arrangement of the engine, the connection of the engine to the driving shafts within the axle, the mounting of the body on the axle and such like features are well understood in the art.

Referring now to the several figures of the drawings, it will be noted that the axle proper 5 is a stationary member, and the driving shaft 6 is rotatably mounted within this axle. At the ends of the axle are vertically positioned yokes 7 forming a bifurcated frame. These yokes 7 are somewhat similar to those in use on front wheels of automobiles, but are larger and stronger, adapting them to embrace my combined universal joint and swivel or steering wheel connections. The yokes 7 are shown in the drawings as having a vertical position, but circumstances may arise wherein it is desirable to incline the yoke and the steering member carried thereby at a slight angle to a vertical position, to cause the vehicle wheels to track and steer more readily. It will be understood by those versed in the art that the yokes may be inclined, as suggested above, without changing the action of the combined steering knuckle and universal joint as described herein. Said universal joint and steering wheel connections comprise three principal members or parts: the outer ring member 8, swivelly mounted in the yoke 7; the outer or socket member 9 of the universal joint, revolubly mounted within said outer ring member and swingable with same to steer the vehicle; and the inner or ball member 10 of the universal joint secured to and carried by said shaft 6. Said member 9 carries or has attached to it the wheel 11. Said outer ring member 8 is provided with trunnions 12, adapting it to be swivelly mounted in the arms of said yoke 7, which has openings 13 to receive same. I provide sleeve bearings or bushings 14 for said openings 13 in which said trunnions 12 are mounted. The outer ends of said yoke arms are provided with slots 15 (see Fig. 6) entering said openings 13, and wide enough to allow said trunnions 12 to pass through into said openings 13 when the device is being assembled. Said slots 15 are not as wide as the outer diameter of said bushings, and said bushings are therefore placed upon the trunnions 12 after the ring 8 has been placed in position.

To retain the bushings 14 in place, transverse clamping bolts 16 are provided in the free ends of said yoke located so as to cut into the outer surface of said sleeves.

The sleeves 14 are provided with transverse grooves 14' in their outer surface to receive the bolts 16, and are thus locked in position longitudinally and rotatably. An inner recess 17 is provided in said ring 8 and an outer annular recess 18 in said socket member 9 registering with said recess 17 and the two forming together an annular ring space in the meeting face of the two members within which a ball bearing member 19 is mounted. This ball bearing member is adapted to permit rotation of said wheel carrying member 9 within the ring 8, as upon a bearing, and at the same time prevents said member 9 from swinging out of its proper relation to said member 8. In other words, the ball bearing member 19 so connects said swivel member 8 and socket member 9 that when said member 8 is turned on its trunnions said member 9 and the wheel 11, carried by same, are revolved or turned upon the axis of said trunnions to steer the vehicle. Preferably said ball bearing member consists of an inner ring 20 mounted in the recess 18 of the socket member 9, and an outer ring or member 21, mounted in the recess 17 of said ring member 8, and two annular rows of rings or balls 22 carried between the rings in suitable ball races. The balls and the walls of the races co-act to prevent relative lateral movement of the ball rings 20 and 21 and consequently retain said ring member 8 and socket member 9 in their proper relative positions. While I have illustrated a particular form of ball bearing for the purpose of operatively connecting said ring or swivel member 8, and the socket or wheel member 9, it will be understood that the form of mounting between said members is not essential so long as the socket member is free to rotate within said ring member, and is also swung or turned with said ring member when it is turned on its trunnions to steer the vehicle. Felt ring collars 23 are provided in registering recesses 24 in the meeting surfaces of said ring member 8 and socket member 9 at each side of said ball bearing 19 to prevent the escape of the lubricant from said bearing and also to prevent dirt or grit from entering therein. Said ring member 8 is divided on a horizontal diameter so that it may be assembled upon the outer ring 21 of said ball bearing 19, and the two parts are secured solidly together by the bolts 25. One of said trunnions of said ring member 8, preferably the lower one, is extended beyond the end of its sleeve bearing and has a lever 26, securely mounted thereon, by which said ring member can be swiveled or turned upon its trunnions. Preferably I square the end of said trunnion and provide the lever 26 with a square hole to receive same securing said lever against removal by a cotter pin 27. Said lever 26 is connected in any convenient manner with the steering gear of the automobile. Said socket member 9 is provided with a spherical recess 28 to receive said ball member 10, said ball and recess being concentric with said shaft and with said outer ring bearing, and their mutual center being on the axial line of said trunnions of said outer ring. Said ball and socket members are operatively connected by radial clutch pins 29 which are carried by said member 9 and are adapted to closely fit and project into slots or recesses 30 provided in said ball member 10, so as to be practically in constant contact with the sides of the recesses. Said recesses 30 are polarily located in the ball member and are longer than the diameter of said pins, longitudinally of the shaft 6, so that said socket can freely swing on the ball while rotating therewith. I divide the socket member 9 preferably on a central vertical plane, which passes through the center of the ball bearing 19, into two parts, the disk or ring member 31 and the wheel-carrying member 32. These two parts are assembled and securely bolted together in position around said ball member 10 and the inner ring 20 of the ball bearing 19 by means of the bolts 33, as clearly illustrated in Fig. 4. Said socket member 9 is provided with a central hollow projection 34 preferably integral therewith and adapted to act as a hub for said wheel 11. The wheel may be mounted or built upon the hub 34 in any convenient manner, but I prefer to provide the hub with an integral annular flange 35, adjacent its inner end, and a loose flange 36 mounted upon its outer end, and securely clamp the inner ends of the spokes 37 therebetween by means of the bolts 38. The outer end of the hollow hub 34 is closed by means of a flange 39, preferably threaded into same, to prevent the escape of the lubricant from the interior of the universal joint and the entering of dust and grit therein.

It will be obvious from the foregoing description that the shaft 6, ball clutch member 10, the socket member 9 and the wheel 11 can all rotate freely as a whole within said ring member 8 upon the ball bearing 19, regardless of the relative positions of the socket member 9 and ball member 10. Also that the outer ring member 8, the socket member 9 and the wheel 11 carried thereby can swing together on the trunnions of said outer ring member 8 without interfering with the rotative motion of the wheel. Said drive shaft 6 is rotatably mounted within said axle 5 preferably upon ball bearings 40, carried thereby, and suitably arranged adjacent the outer ends thereof. Said shaft receives power from the engine (not shown) by means of the shaft 41, and differential gearing 42, the latter illustrated by its casing only.

Thus it will be seen that I have provided a front wheel drive for automobiles, which is made up of a comparatively few very substantial parts, and by which the driving and steering operations can be performed simultaneously.

I claim:

1. A steering and driving wheel for motor vehicles including, in combination, a yoke, a bearing ring vertically swiveled in the yoke, a wheel having a ring turning in said swiveled bearing ring, a socket member, a ball driving member within the socket member, and a pin and slot connection between the ball and socket members, said pin and slot connection including not more than two pins and slots, substantially as described.

2. A steering and driving wheel for motor vehicles including, in combination, a yoke, a bearing ring vertically swiveled in the yoke, a wheel having a ring turning in said swiveled bearing ring, a socket member, a ball driving member within the socket member and a pin and slot connection between the ball and socket members, said pin and slot connection including not more than two pins and slots polarily located with reference to the ball member, substantially as described.

3. A steering and driving wheel for motor vehicles including, in combination, a yoke, a bearing ring vertically swiveled in the yoke, a wheel having a ring turning in said swiveled bearing ring, a socket member, a ball driving member within the socket member and a pin and slot connection between the ball and socket members, said pin having a close fit diametrically at all points in its slot and said connection including not more than two pins and slots, substantially as described.

4. A steering and driving wheel for motor vehicles including, in combination, a suitable mounting permitting the wheel to oscillate horizontally, a socket member, a ball driving member within the socket member, and a pin and slot connection between the ball and socket members, said pin and slot connection including not more than two pins and slots polarily located, substantially as described.

In testimony whereof, I have hereunto set my hand, this 17th day of Sept. 1910, in the presence of two subscribing witnesses.

RALPH H. ROSENBERG.

Witnesses:
 E. H. McCLOUD,
 ALBERT RUSH.